United States Patent [19]
Neschke et al.

[11] 3,919,991
[45] Nov. 18, 1975

[54] AUTOMATIC DECOMPRESSION DEVICE

[75] Inventors: Rex Harding Neschke, El Segundo; John Louis Zimmerer, Torrance, both of Calif.

[73] Assignee: McCulloch Corporation, Los Angeles, Calif.

[22] Filed: Jan. 7, 1974

[21] Appl. No.: 431,311

[52] U.S. Cl. .................. 123/182; 251/65; 137/517
[51] Int. Cl.² ........................................ F01L 13/08
[58] Field of Search............ 123/182, 97 B; 251/65; 137/517

[56] References Cited
UNITED STATES PATENTS

| | | | |
|---|---|---|---|
| 2,742,380 | 4/1956 | Peters | 123/182 |
| 2,743,078 | 4/1956 | Jordan | 251/65 |
| 3,335,711 | 8/1967 | Roorda | 123/182 |
| 3,704,988 | 12/1972 | Steele | 123/182 |

FOREIGN PATENTS OR APPLICATIONS

| | | | |
|---|---|---|---|
| 1,002,164 | 2/1957 | Germany | 123/182 |
| 1,071,913 | 12/1952 | France | 123/182 |

*Primary Examiner*—Charles J. Myhre
*Assistant Examiner*—James D. Liles
*Attorney, Agent, or Firm*—Burns, Doane, Swecker & Mathis

[57] ABSTRACT

An automatic decompression valve to facilitate starting of an internal combustion engine operable to relieve compression pressure during cranking and maintain full compression during operation of the engine is disclosed. The valve has an inlet in communication with the interior of the cylinder of the engine and an outlet. A valving element is movable to selectively block the inlet in response to an increase in pressure in the cylinder. A magnetic biasing element is provided for urging the valving element towards a valve open position. When the engine is cranked, compression pressure is released through the valve until the engine starts, whereupon the pressure in the cylinder acts on the valving element to close the valve. An auxiliary friction producing element is operatively associated with the valving element to provide a friction sufficient to hold the valving element in a valve closed position against the magnetic force tending to open the valve during operation of the engine but insufficient to hold the valving element in a valve closed position against the magnetic force when the engine is off.

14 Claims, 6 Drawing Figures

U.S. Patent  Nov. 18, 1975  3,919,991
FIG. 1
FIG. 2
FIG. 5
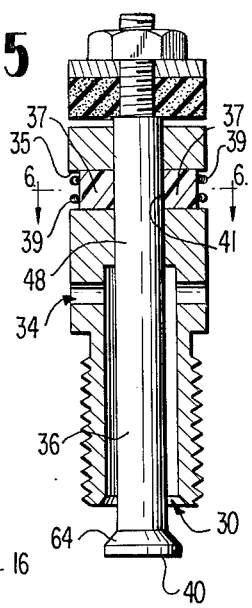
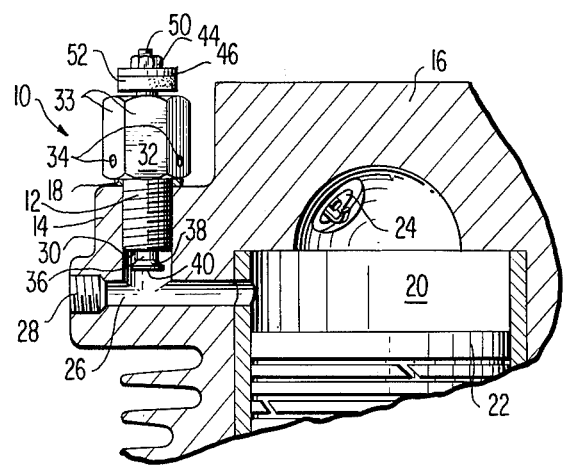
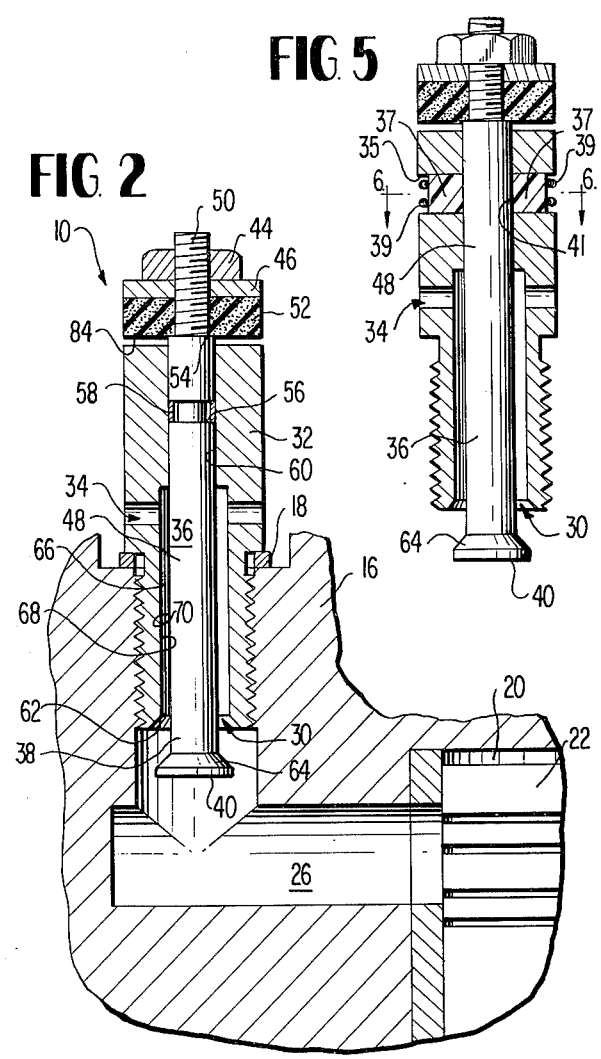
FIG. 3
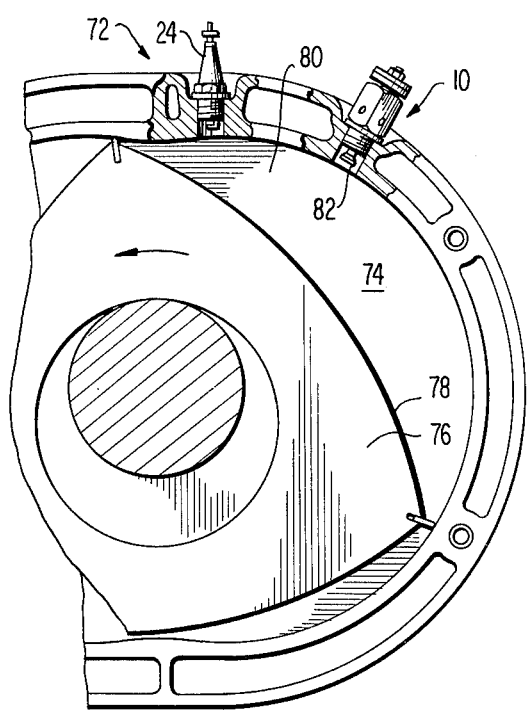
FIG. 4
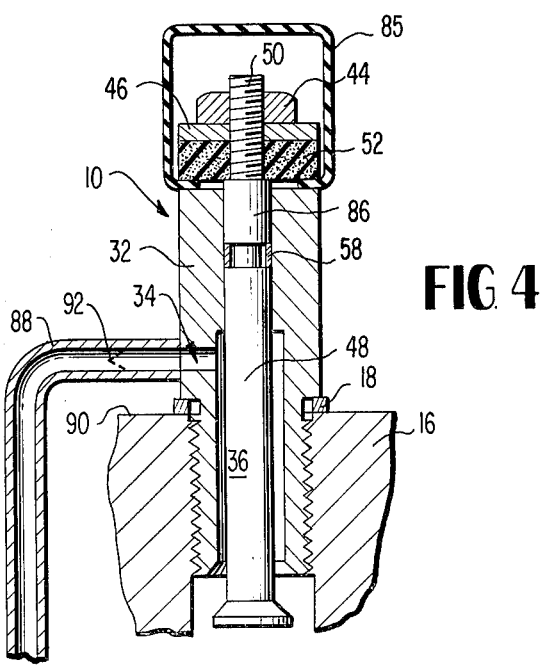
FIG. 6
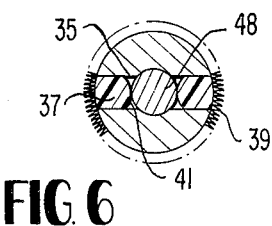

AUTOMATIC DECOMPRESSION DEVICE

BACKGROUND OF THE INVENTION

The present invention relates to a novel apparatus for facilitating the starting of an internal combustion engine, and more particularly, to an apparatus for automatically partially relieving compression pressure in a cylinder of an internal combustion engine while the engine is being cranked and for maintaining full compression pressure in the cylinder when the engine is operating.

Much of the work needed to crank an internal combustion engine during starting is expended in compressing the charge of gas in the working cylinder or combustion chamber during the compression stroke of the piston. This work required for cranking can be reduced almost in direct proportion to the amount by which compression can be relieved. Hence, if there can be achieved a very substantial relief of compression pressure during the cranking revolutions of the engine, as is attained with the present invention, an inexpensive rope starter can become a satisfactory mechanism; or, if the utmost ease and convenience is desired, the use of a small and inexpensive electric self-starter becomes feasible.

Of course, the apparatus utilized for compression relief should also enable substantially normal compression pressures to be maintained while the engine is operating. Moreover, it is extremely desirable that such an apparatus be automatic in accommodating itself to the different conditions occurring during cranking and operation and as well as during repeated attempts at starting.

In addition, it is particularly important to maintain substantially full compression in the combustion chamber during idling or very slow speed operation of the engine, and an automatic apparatus should not operate to vent compression during idling of the engine, particularly in the event of a misfire.

Generally, compression relief can be effected by providing for the more or less controlled escape of gas from the combustion chamber as the working piston is moving through the first portion of its compression stroke during cranking or starting.

In the past, it has been common to start internal combustion engines, and particularly small two stroke engines, by first actuating a decompression valve lever by hand to place the engine in a condition relatively free from the loading due to compression. The engine would then be cranked in this condition manually or by an electric starting mechanism. When the engine attained an appropriate operating condition, the decompression valve lever would be returned to its valve-closed position.

However, if an operator of an engine having such a decompression valve were to forget to actuate the valve prior to cranking, the decompression would not be effected. This could result in resistance to a rope type starter sufficient to produce jerking of a hand held engine, such as that of a chain saw, away from the grip of the operation with possible injury to the operator or damage to the engine resulting. Moreover, electric self-starting mechanisms may be severely damaged where resistance from normal engine compression occurs.

Attempts have been made to construct an automatic decompression valve which would eliminate the requirement of manual actuation to effect easy starting of an internal combustion engine. Some prior art valves utilize a spring biased valve element as part of the valve assembly.

However, spring biased decompression valves may be subject to a tendency to "chatter"; that is to say, the pulsating pressure in the combustion chamber of the engine may partially unseat the valve element with each cycle of the working piston, thus, causing an oscillation or vibration in the valve element which may diminish the valve's effectiveness and eventually reduced its sealing capability. Moreover, such spring biased valves may not accommodate the case of rapid, repeated attempts to start the engine since such valves may not permit the working cylinder or combustion chamber to "bleed down" in sufficient time.

Of independent significance is the problem associated with low speed or idle conditions of the internal combustion engine. In many instances, the compression pressure within the working cylinder are barely sufficient to keep a spring biased decompression valve closed. When a misfire occurs, the pressure within the working chamber may drop to a level below that sufficient to keep the valve closed, and, as a result, the valve will be forced open by the spring. When the valve opens, there is a loss of compression pressure in the working chamber, and in many cases, the engine will stop operating to the great annoyance and inconvenience of the operator.

OBJECTS AND SUMMARY OF A PREFERRED FORM OF THE INVENTION

Accordingly, it is a general object of the present invention to provide a novel, automatic decompression starting valve which substantially minimizes the problems previously existing in the prior art.

It is a more particular object of the present invention to facilitate starting of an internal combustion engine, and to provide an novel automatic decompression starting valve for initially relieving compression pressure in an internal combustion engine during cranking and for automatically maintaining normal compression pressure during operation of the engine.

It is likewise an object of the present invention to provide a novel, automatic decompression starting valve which is not subject to chatter by reason of being spring biased into an actuation mode.

It is also an object of the present invention to provide a novel, automatic decompression starting valve for starting an internal combustion engine which valve will operate to maintain normal compression pressures within the engine during idle speeds, and particulaly, during misfires which may occur during idle speeds of the internal combustion engine.

A preferred embodiment of the invention intended to accomplish at least some of the foregoing objects includes a valve comprising a housing having an inlet for communicating with an interior of a working cylinder of an internal combustion engine, an outlet for communicating with a zone having relatively lower pressure than the interior of the working cylinder, and a transfer passage for connecting the inlet to the outlet. A valving element is included for selectively blocking the inlet in response to an increase in pressure in the interior of the working cylinder. The valving element is magnetically biased towards a valve open condition in order to vent compression pressure during cranking of the engine. A dampener or auxiliary friction means is utilized in conjunction with the valve element to impede the response time of the valve element in order to resist oscillation of the valve at very low speed operation of the internal combustion engine.

BRIEF DESCRIPTION OF THE DRAWINGS

Other objects and advantages of the present invention will become apparent with reference to the following detailed description of a preferred embodiment thereof in connection with the accompanying drawings, wherein like reference numerals have been applied to like elements, in which:

FIG. 1 is a fragmentary, partial section view of a working cylinder of an internal combustion engine showing an automatic decompression starting valve according to the present invention;

FIG. 2 is a fragmentary, partial section view of the automatic decompression starting valve of FIG. 1 wherein the valve is in an open position;

FIG. 3 is a fragmentary, partial sectional view of a rotary piston of an internal combustion engine showing an automatic decompression starting valve according to the present invention;

FIG. 4 is a fragmentary, partial sectional view of an automatic decompression starting valve having a cover thereon and where the output of the valve is directed into the crankcase of the internal combustion engine;

FIG. 5 is a fragmentary, partial sectional view of a preferred embodiment of an automatic decompression starting valve according to the present invention; and FIG. 6 is a section view through section line 6—6 in FIG. 5.

DETAILED DESCRIPTION OF A PREFERRED EMBODIMENT OF THE PRESENT INVENTION

Referring now to the drawings, wherein like reference characters have been applied to like parts throughout, there is shown in FIG. 1 an automatic poppet decompression starting valve 10 (which hereinafter may be referred to simply as "valve") affixed by a threaded portion 12, to an upper cylinder portion 14 of an internal combustion engine 16. A sealing washer 18 may be employed in this connection. It will be appreciated that the valve 10 of the present invention may be used in a variety of engine types, e.g., 2-cycle, 4-cycle and rotary piston engines.

The engine has a working cylinder 20, a piston 22, and a sparkplug 24. Since the working parts of an internal combustion engine do not, in and of themselves, comprise a portion of the present invention, the details of such an engine need not be presented herein. However, it will be appreciated from the foregoing background of this invention that the valve may be operable in combination with conventional reciprocating or rotary piston engines.

A passage 26 places the valve 10 in communication with the cylinder 20. A maintenance plug 28 may be provided for access to the passage 26 for purposes of cleaning away any deposits which may accumulate. It will be appreciated, of course, that the passage 26 may have a variety of shapes, lengths, and orientations and may be cleaned in the absence of such a maintenance plug by simply unscrewing and removing the valve 10. Indeed, in some instances, the valve may be inserted directly into the combustion chamber of the engine, as disclosed in connection with FIG. 3.

A gas inlet port 30 is provided at the mouth of the threaded portion 12 at one end of the housing portion 32 of the valve. Outlet ports 34 (two of which may be seen in FIG. 1) are provided in the housing portion 32 of the valve. The housing has six faces 33 (three of which may be seen in FIG. 1) which may be arranged in a hexagonal fashion to permit insertion or removal of the valve by means of a conventional wrench or similar tool.

The valve has a valve element or valving piston 36 which is movable between a valve open and valve closed position. At a first end 38 of the valving element there is a pressure reaction face 40, and another end 42 of valving element is threaded to receive a fastening nut 44.

A magnetic material 52 is attached to the end of the valving element and is operable to bias the valving element 36 in a valve open position, as will be more fully described hereinbelow.

With reference now to FIG. 2, there may be seen the valve 10 of FIG. 1 in cross-section. It will be noted in FIG. 2 that a maintenance plug (element 28 in FIG. 1) has been omitted from this view.

In FIG. 2, the pressure reaction face 40 of the valving element 36 is carried by a stem portion 48 of the valving element which is movable within the housing 32 of the valve. The stem portion 48 has a threaded extension 50 which carries the preferably threaded magnet 52 and fastening nut 44. With the engine off, the valving element 36 is biased in a valve open position by the effect of the magnetic force drawing the magnet 52 to the metallic housing 32. In order to provide an adjustment of the magnetic force biasing the valve towards a valve opened position, the threaded magnet 52 may be rotated in order to be moved axially along the threaded extension 50, and a lock washer 46, which is part of the magnetic circuit, may be interposed between the locking nut 44 and the magnet 52 to permit the magnet to be locked at a desired position.

During slow speed operation of the engine 16, e.g., idling, the pressure on the reaction face 40 may fluctuate considerably. Hence, the forces tending to maintain the valve in a closed position may fluctuate with the pressure during such engine operation. These pressures may fall to levels very close to the minimum pressure required to provide the force needed to overcome the magnetic force tending to open the valve. When, say, a misfire occurs in the cylinder, the pressure on the reaction face may momentarily drop below that necessary to maintain the valve in a closed position.

In order to maintain the valve in a closed position when the pressure on the reaction face momentarily drops below the minimum closing pressure, means are provided to hold the valving element in the valve closed position for at least the duration of the momentary pressure drop, yet permit the valve to automatically open when the pressure drops below closing level when the engine has stopped.

For this purpose, the housing 32 may have a pair of diametrically opposed radial apertures 35 each of which carries a TEFLON button or contact element 37 which may be seen in FIGS. 5 and 6. These buttons 37 are held in the apertures 35 by a pair of garter springs 39. These springs 39 are operable to urge a head portion 41 of the buttons 37 against the stem portion 48 of the valving element 36.

In the alternative, the stem 48 of the valving element may have a circumferential channel 56 which carries an O-ring or washer 58 or such similar auxiliary friction producing means (see FIGS. 2 and 4). This channel 56 may be situated in the valving element stem such that the O-ring or washer 58 is always in contact with an interior reduced diameter wall 60 of the housing 32 regardless of the position of the valving element 36. The O-ring would have a working travel distance corresponding to a distance the valving element must travel to move from a completely open condition of the valve to a completely closed condition.

To prevent the valve from opening when a momentary pressure drop occurs in the working cylinder, an additional frictional force is provided, in the case of the embodiment shown in FIGS. 5 and 6, between the head 41 of the buttons 37 and the stem 48, to augment the working friction of the valve. As may be seen in FIGS. 2 and 4, the O-ring 58 and the interior wall 60 of the housing similarly provide augmented friction to impede movement of the valving element 36.

This auxiliary friction may be from five to ten grams. Buttons 37 fabricated from TEFLON or nylon and O-rings or washers 58 fabricated from elastomeric material have been found to provide appropriate friction characteristics. This auxiliary friction is sufficient to hold the valving element in a valve closed position against the force of the magnet when there is a momentary drop in cylinder pressure. However, when the engine is shut down or when the engine is intially cranked, this auxiliary friction is overcome by the magnetic force tending to open the valve.

The inlet 30 and the outlet 34 ports may be seen with greater particularly in FIG. 2. The inlet port 30 has a bevelled edge or valve seat 62 which is operable to receive a corresponding bevelled pressure reaction surface 64 on an obverse side of the face 40 of the valving element 36. An annular transfer passage 66 places the inlet port 30 in fluid communication with the outlet port 34. It will be appreciated that this transfer passage is defined by an interior wall 68 of a greater diameter portion of the housing and the exterior wall 70 of the stem 48 of the valving element 36.

In FIG. 3 there can be seen the automatic decompression valve 10 affixed by the threaded portion 12 to a conventional rotary piston internal combustion engine 72. The valve 10 is placed in communication with a compression zone generally indicated at 74. The rotary piston engine has a generally triangular rotary piston 76 with convex sides 78, a cylinder 80, and a sparkplug 24. A passage 82 places the valve 10 in communication with the compression zone 74 in the cylinder. The rotary valve engine operates in a known fashion, and its details will therefore not be discussed.

FIG. 4 is a fragmentary, partial sectional view of the valve 10 having a cover 85 attached to the housing 32 and wherein the output of the valve has been placed in communication with a crankcase (not shown) of the engine 16 into which the valve has been inserted.

The cover 85 may be operable to protect the magnet 52, metallic lock-washer 46, fastening nut 44, and an upper portion 86 of the stem 48 of the valve element from exposure to dirt or grime. In addition, the cover 85 can prevent an accidental pressing down on the stem to thereby open the valve during operation of the engine.

The outlet port 34 of the valve 10 may be placed in direct fluid communication with the crankcase (not shown) of the engine by means of a suitable tubing 88. In engines with suitable starting characteristics, the port 34 may be placed in communication with a carburetor inlet manifold (also not shown). The tubing 88 may be attached to both the valve housing 32 and the crankcase or manifold with convention fittings not here shown. In this manner, the normally hot combustion gases which are vented during cranking of the engine in the practice of the present invention, may be prevented from coming into contact with an operator of the engine. Moreover, there may be prevented a depositing of such hot gases onto a surface 90 of the engine to the damage of detriment of these surfaces. In addition, the recirculation of the exhausted gas through the engine may reduce pollution of the air in the immediate vicinity of the engine.

Of independent significance is the suction which may be applied at the outlet port 34 of the valve during operation of the engine as a result of suction produced in the crankcase or manifold. This suction augments the forces tending to hold the valve in a closed position during operation of the engine.

In the operation of a two stroke engine, the pressure in the crankcase will fluctuate with the movement of the piston of the engine.

A check valve schematically shown at 92, may be used to prevent or at least impede a flow of gases from the crankcase towards the outlet port of the valve which may have a tendency to occur when the pressure in the crankcase is relatively higher than the pressure in the working cylinder. This valving function may be accomplished with a conventional heavy duty check valve.

However, the check valve 92 allows relative suction existing in the line 88 to be transmitted to the outlet port 34 of the valve to thereby further urge the valve element 36 towards a closed position. Although desirable, it will be appreciated that such a check valve 92 is not necessarily essential to the practice of the present invention, particularly if manifold suction is utilized.

As noted above, with the engine 16 off, the valving element 36 is biased in a valve open position by the effect of the magnetic force drawing the magnet 52 to the metallic housing 32. A bottom portion 84 of the magnet 52 limits the extent of travel of the valving element 36. The magnet 52 may be moved to various axial positions on the threaded portion 50 to make adjustments in the valve according to the characteristics of the particular internal combustion engine with which the valve is to be used.

With the valve in a valve open position, when the engine 16 is cranked, compressed gas from the working cylinder 20 passes into the passage 26 and then enters the valve through the inlet port 30. This gas passes through the transfer passage 66 and vents or "bleeds off" to a relatively low pressure zone through the outlet port 34. The outlet port or ports may vent to the atmosphere or may feed back into another portion of the engine, such as the crankcase, having a relatively lower pressure than the working cylinder as shown in FIG. 4. The number and size of the outlet port or ports may be varied to accommodate the particular operating characteristics of the engine with which the valve is used.

Some of the gas generated in the working cylinder 20 forms a static pressure head on the face 40 of the valving element. This pressure acts to impose a closing force on the valve. The pressure head on the face of the valving element provides a closure force with the first fired or ignited charge in the working chamber of the engine and provides a substantial closing force as the engine continues to operate.

In this connection, tests have shown that for small 2-cycle internal combustion engines the compression in the combustion chamber due to cranking is constant at about 80 psi when the valve is mounted so as to communicate with a portion of the chamber (FIGS. 1 and 2) and 150 psi when mounted in a head portion of the chamber. 80 to 90 psi of compression are required to start and run such an engine. About 100 to 120 psi is preferred. At these pressures, valve remains open and compression pressure is vented through the valve. However, the first fired or ignited charge developes a pressure of 260 to 370 psi which is sufficient to overcome the magnetic and other forces holding the valve open, and the valve closes to maintain usual compression pressure in the combustion chamber.

The auxiliary friction device provides static friction which functions to impede both the opening and the closing of the valve. That is to say, in the absence of the auxiliary friction device, the pressure head on the face 40 of the valving element would need only to produce a force to overcome the working friction of the valve stem 48 plus magnetic force tending to maintain the valve element in a valve open position. With the addition of the auxiliary friction means, however, slightly greater pressure is need to move the valving element to a valve closed position.

The magnetic forces tending to bias the valve element is a valve open position diminishes with the inverse square of the distance from the magnet 52 to the metallic housing 32 of the valve. Thus, a slight displacement of the face towards a valve closed position will significantly reduce the force resisting closure of the valve.

Once the valving element has moved in a direction away from the working cylinder to seat the bevelled surface 64 of the valving element against the bevelled edge 62 of the inlet port, the valve is in a valve closed position and prevents the escape of compression pressure from the working cylinder.

Once the valving element 36 has moved to a position to close the valve, the force of the relatively high pressure gas in the working cylinder acting on the valve face 40 will hold the valve closed, e.g., the valving element face 40 will be forced tightly against the inlet port to block communication between the inlet port and the outlet port.

The tendency of the valving element to remain seated during engine operation is enhanced by the fact that the valving element is impeded against movement by the auxiliary friction device or dampening means. In addition, if the outlet port of the valve is placed in communication with a low pressure zone having a relatively lower pressure than the atmosphere, e.g., the crankcase of the engine, the tendency of the valve to remain in a valve closed position will be enhanced by the increased difference in pressures.

At very low engine speeds, e.g., at idle, the pressure on the face of the valving element may fluctuate considerably. This fluctuation reflects a fluctuation in the forces tending to maintain the valve in a valve closed position.

Many prior art valves utilize a spring to bias the valve in a normally open condition. A substantial reduction in cylinder pressure, as might occur during idling of the engine or particularly in the event of a misfire of the engine at low speed, could cause the valve to open. The opening of the valve during very low speed operations of the engine will usually result in stopping of the engine. Even if such prior art devices did not fully open, in many cases, these valves might partially unseat with each exhaust intake during such low speed or idle operations of the engine and create a "chatter" of the valve with a significant decrease in performance of the engine.

However, the apparatus of the present invention overcomes these and other shortcomings of the prior art. The magnetic force which tends to automatically open the valve is at its lowest level by virtue of the inverse square relation of magnetic attraction to distance, when the valve element is in a valve closed position. Thus, slight pressure fluctuations are not as critical. Moreover, the auxiliary friction device provides resistance to the magnetic force urging the valving element to an open position, and if a sudden reduction in pressure should occur in the working cylinders as a result of, say, a misfire, the valve would not open before valve closing pressure is restored to the face of the valving element.

When the engine is stopped by the operator, the pressure in the working cylinder will be reduced, and the magnetic forces between the magnet and the metallic housing of the valve will be sufficient to overcome the ordinary working friction of the valve and the additional friction imposed by the auxiliary friction device, and the valve will then autumtically open and be in the appropriate condition for further engine cranking.

As noted above, to adopt the valve for engines having different operating characteristics, such as higher or lower compressions or different piston displacements, the magnet position may be varied to alter the permissible travel of the valving element so as to enable a higher or lower engine cylinder pressure to operate the valve. In addition, the size of the outlet ports may be modified to accommodate various engine characteristics.

It will be appreciated, that the operation of a valve according to the present invention is essentially independent of spatial orientation of the valve with respect to the engine cylinder. That is, the valve may be attached at any convenient point on an internal combustion engine without particular regard to forces of gravity.

Furthermore, the operation of a valve according to the present invention may occur with the magnet 52 attached or embedded in the housing 32 and with a metallic or otherwise magnetically responsive material attached to the extension 50 of the stem 48.

The operation of the valve in the compression zone of the rotary piston engine is substantially similar to that in the reciprocating piston engine described above and need not be discussed in further detail.

Thus, it can be seen with the valve of the present invention, compression from the cylinder is allowed to escape at a predetermined rate, thereby faciliating easy cranking of the engine. After the first firing cycle of operation, the gas acting on the face of the valving element provides a sufficient force to push the valving element towards the bevelled valve seat in order to close the valve. The auxiliary friction device dampens the movement of the valving element as the valve closes. The biasing action of the magnet decreases relatively quickly as the magnet moves away from the housing of the valve. With the closing of the valve, the compression in the cylinder may rise to its full valve, and the engine may proceed to function normally. During slow speed operation of the engine, e.g., idling, the pressure in the cylinder may drop, particularly in the event of a misfire. However, the auxiliary friction device impedes the movement of the valving element to the extent that a momentary drop in cylinder pressure will not provide sufficient time for the valve to open, and the pulsating pressure in the cylinder will not create a chatter of the valve with a significant decrease in valve effectiveness and in engine performance. When the engine is stopped, the force of the magnet is sufficient to automatically open the valve.

SUMMARY OF ADVANTAGES AND SCOPE OF THE INVENTION

It will be appreciated that in constructing an automatic decompression valve for easy starting of an internal combustion engine according to be present invention, certain significant advantages are provided.

In particular, the operation of the valve according to the invention provides completely automatic decompression for easy starting, and hence, minimizes the work needed to crank an internal combustion engine.

Also important is the capability of utilizing an electric self-starting mechanism for an internal combustion engine without encountering damage to such a device as a result of a failure to provide decompression for a working cylinder.

Also advantageous is the ability to easily crank and start hand held power tools such as chain saws which utilize internal combustion engines with a reduced danger of an operator's pulling on such a device out of his grasp as a result of pulling smartly on a rope type starter and encountering full compression forces because he forgot to actuate a manual decompression valve.

Of further importance is the elimination of a mechanical spring to bias a decompression valve towards a particular mode by eliminating such a spring. Improved cranking and starting are likely to be experienced over longer periods of time without malfunction from deposits. In this connection, "chatter" problems are also minimized and valve stability is enhanced.

Moreover, the valve of the present invention combines the effect of a rapid reduction in magnetic force (in accordance with the inverse square of distance law) with a mechanical dampening means to substantially eliminate premature valve opening at very low operating speeds of the internal combustion engine, for example, during idling, and particularly in instances where a misfire occurs during idling.

Thus, it is apparent that there has been provided, in accordance with the present invention, an automatic decompression valve for easy starting of an internal combustion engine that substantially satisfies the objects and advantages set forth above. While the invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. An automatic decompression valve apparatus to facilitate starting of an internal combustion engine, said apparatus comprising:
   housing means comprising:
      inlet means for communicating with an interior of a cylinder of said internal combustion engine;
      outlet means for communicating with a zone having relatively lower pressure than said interior of said cylinder during operation of said internal combustion engine;
      transfer passage means for connecting said inlet means to said outlet means;
   valving element means movable between a valve-open mode wherein said inlet outlet means are placed in communication, and a valve-closed mode wherein said valving element blocks said communication in response to increased pressure in said interior of said cylinder during operation of said internal combustion engine;
   permanent magnet biasing means for continuously biasing said valving element means toward said valve-open mode to automatically vent cylinder compression pressure during starting of said internal combustion engine;
   said permanent magnet biasing means being yieldable in response to increased pressure in said cylinder during operation of said engine to allow said valving element to be automatically shifted to said valve-closed mode of operation by said increased pressure against the bias of said permanent magnet;
   the biasing action of said permanent magnet biasing means becoming progressively weaker as said valve element approaches its valve-closed mode; and
   auxiliary friction means on one of said housing means and said valving element means and biased into frictional engagement with the other of said housing means and said valving element for frictionally impeding movement of said valving means to prevent automatic opening of said valve apparatus at low speed operation of said internal combustion engine;
   said auxiliary friction means being arranged to allow movement of said valving element means to said open mode under the urging of said permanent magnet means when said engine is in a stopped condition.

2. The automatic decompression valve apparatus of claim 1, wherein said auxiliary friction means comprises:
   annular channel means disposed in said valving element means; and
   flexible means carried by said annular channel means for frictionally engaging an inner wall of said housing means.

3. The automatic decompression valve apparatus of claim 1, wherein said auxiliary friction means comprises:
   contact element means for frictionally engaging said valving element means; and
   biasing means for biasing said contact element means against said valving element means.

4. The automatic decompression valve apparatus of claim 1, wherein said outlet means is in direct fluid communication with the atmosphere.

5. The automatic decompression valve apparatus of claim 1, including:
   conduit means operable to communicate said outlet means with an interior portion of said internal combustion engine to prevent discharge of gases from said valve outlet means directly into the atmosphere surrounding said engine; and a check valving means disposed in said conduit means for excluding positive pressures developed in said interior portion of said internal combustion engine from the interior of said decompression valve and for permitting negative pressures to act on the interior of said decompression valve.

6. An automatic decompression valve apparatus to facilitate starting of an internal combustion engine, said apparatus comprising:
   housing means comprising:
      inlet means for communicating with an interior of a cylinder of said internal combustion engine;
      outlet means for communicating with a zone having relatively lower pressure than said interior of said cylinder during operation of said internal combustion engine;
      transfer passage means for connecting said inlet means to said outlet means;
   valving element means
      movable to a valve-open mode for initially opening said valve apparatus to vent compression pressure in said cylinder of said internal combustion engine during startup of said engine, and
      movable to a valve-closed mode for blocking said inlet means in response to a predetermined ignition-induced pressure increase in said interior of said cylinder to maintain ordinary compression pressure in said cylinder during operation of said internal combustion engine;
   means continuously biasing said valve element means toward said open mode;
   auxiliary friction means on one of said valving element means and said housing means and being biased into frictional contact with the other of said valving element and said housing means for providing a friction that is:
      sufficient to hold said valving element means against valve-opening forces occurring during operation of said engine tending to move said valve element to said open mode; and
      insufficient to hold said valving element means against forces tending to move said valve element means to said closed position when said engine is off.

7. The automatic decompression valve apparatus of claim 6, wherein said auxiliary friction means comprises:
   annular channel means disposed in said valving element means; and
   flexible means carried by said annular channel means for frictionally engaging and inner wall of said housing means.

8. The automatic decompression valve apparatus of claim 6, wherein said auxiliary friction means comprises:
   contact element means for frictionally engaging said valving element means; and
   biasing means for biasing said contact element means against said valving element means.

9. The automatic decompression valve apparatus of claim 7, wherein said outlet means is in direct communication with the atmosphere.

10. The automatic decompression valve apparatus of claim 6, including:
   conduit means operable to communicate said outlet means with an interior portion of said internal combustion engine to prevent discharge of gases from said valve outlet means directly into the atmosphere surrounding said engine; and
   a check valving means disposed in said conduit means for excluding positive pressures developed in said interior portion of said internal combustion engine from the interior of said decompression valve and for permitting negative pressures to act on the interior of said decompression valve.

11. A method of operating an internal combustion engine comprising the steps of:
   introducing a valve housing into an interior of a cylinder of an internal combustion engine to place the cylinder in fluid communication with a zone of relatively lower pressure than the interior of the cylinder during operation of the engine;
   introducing a valving element into the valve housing to selectively open and block the communication through the valve housing;
   continuously magnetically urging the valving element to a position to open communication through the valve housing;
   cranking the internal combustion engine while simultaneously venting through the valve housing, and into the relative low pressure zone, compression pressure in the cylinder;
   moving the valving element in response to an increase in cylinder compression pressure and to overcome the magnetic urging so as to shift said valving element to a position in which said valving element blocks the communication through the valve housing to restore full compression to the cylinder and in which the magnetic valve-opening urgings are weakened; and
   exerting frictional forces on said valving element by auxiliary friction means mounted on one of said valving element and said housing and biased into frictional engagement with the other of said valving element and said housing, said frictional forces being of an intensity suitable for:
   resisting valve-opening forces during operation of said engine, and
   being overcome by valve-opening forces when said engine is off.

12. An automatic decompression valve apparatus to facilitate starting of an internal combustion engine, said apparatus comprising:
   housing means comprising:
      inlet means for communicating with an interior of a cylinder of said internal combustion engine;
      outlet means for communicating with a zone having relatively lower pressure than said interior of said cylinder during operation of said internal combustion engine;
      transfer passage means for connecting said inlet means to said outlet means;
   valving element means, having a pressure reaction face at an end of said valving element means nearest to the interior of said cylinder, said valve element means being movable between:
      a valve-open position for intially opening said valve apparatus to vent compression pressure in said cylinder of said internal combustion engine during starting of said engine, and
      a valve-closed position for blocking said inlet means in response to a predetermined ignition-induced increased pressure on said reaction face, corresponding to increased pressure in said interior of said cylinder, to maintain ordinary compression pressure in said cylinder during operation of said internal combustion engine; and permanent magnetic biasing means continuously biasing said valving element means toward a valve-open mode for:

holding said valving element means in a valve open position when said engine is in a nonoperating condition; and urging said valve element towards said valve open position when said reaction face is displaced in a direction away from said interior of said cylinder into a valve closed position during operating conditions of said engine;

the biasing action of said permanent magnet biasing means becoming progressively weaker as said valve element approaches its valve-closed mode; and at least a portion of said magnetic biasing means being mounted on said valving element means to define valving element movement limiting means for limiting movement of said valving element means in a valve open direction.

13. The automatic decompression valve apparatus of claim 12, wherein said outlet means is in direct fluid communication with the atmosphere.

14. The automatic decompression valve apparatus of claim 12, including:

conduit means operable to communicate said outlet means with an interior portion of said internal combustion engine to prevent discharge of gases from said valve outlet means directly into the atmosphere surrounding said engine; and a check valving means disposed in said conduit means for excluding positive pressure developed in said interior portion of said internal combustion engine from the interior of said decompression valve and for permitting negative pressures to act on the interior of said decompression valve.

* * * * *